Dec. 6, 1927.
E. H. SPECHT
1,651,974
TRUNK RACK
Filed Dec. 8, 1926     2 Sheets-Sheet 1
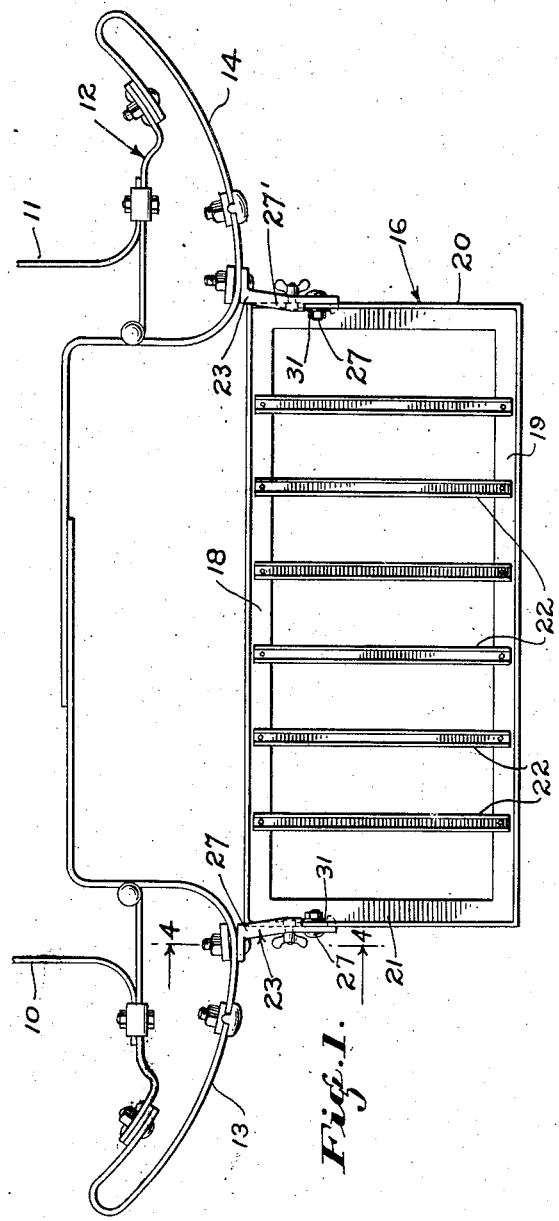
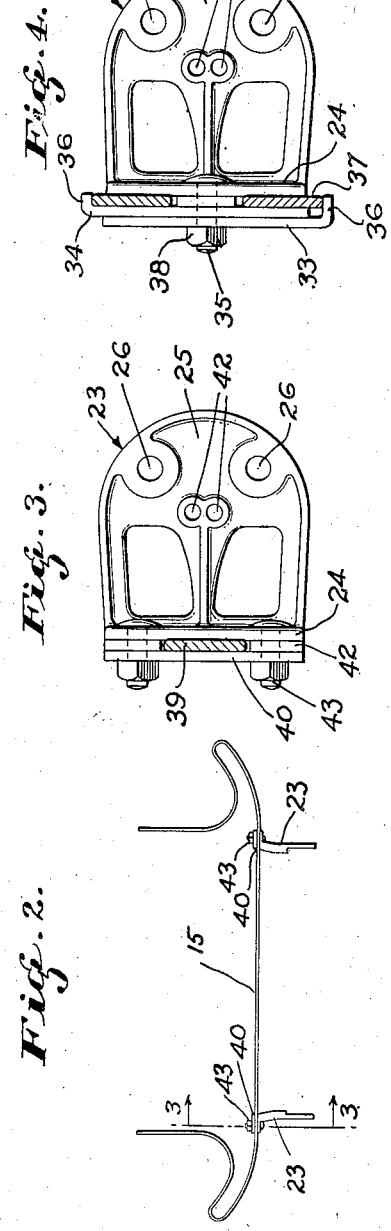
INVENTOR.
EDWARD H. SPECHT.
BY
*Townsend, Loftus & Abbett*
ATTORNEYS.

Dec. 6, 1927.  1,651,974
E. H. SPECHT
TRUNK RACK
Filed Dec. 8, 1926   2 Sheets-Sheet 2
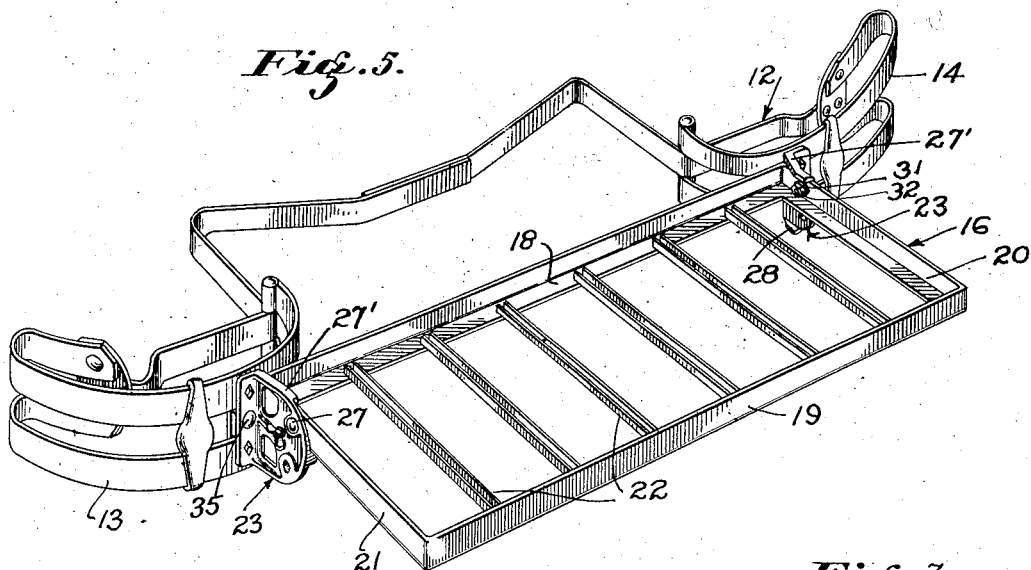
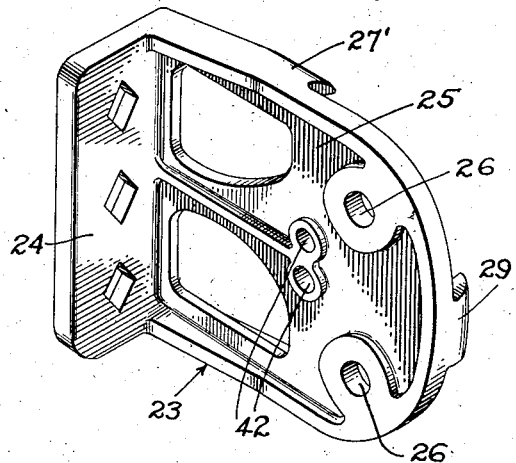
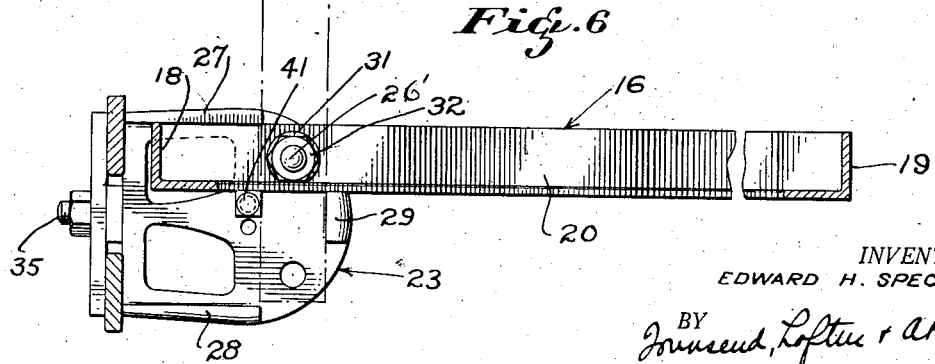
INVENTOR.
EDWARD H. SPECHT.
BY Townsend, Loftus & Abbett
ATTORNEYS.

Patented Dec. 6, 1927.

1,651,974

UNITED STATES PATENT OFFICE.

EDWARD H. SPECHT, OF OAKLAND, CALIFORNIA.

TRUNK RACK.

Application filed December 8, 1926. Serial No. 153,229.

This invention relates to automobile accessories, and particularly pertains to a folding trunk rack adapted to be mounted upon automobile bumpers and the like.

It is often found desirable in the operation of an automobile to provide suitable additional carrying space for luggage and the like without decreasing or cramping the space required by the occupants of the vehicle. This demand is sometimes met by strapping luggage upon the running gear of the car, which arrangement is not only unsightly but imposes an unequal load upon the spring suspension of the vehicle. Other expedients have been concerned with the application of the luggage to the rear of the vehicle by mounting it upon permanent luggage or trunk platforms secured at the rear of the vehicle, or temporary makeshifts carried by the rear frame and the like.

In my Patents Nos. 1,506,274 and 1,522,339, issued to me on August 26th, 1924, and January 6, 1925, respectively, I have shown trunk racks pivotally mounted in connection with automobile bumpers and with automobile bumper tips or wings. In these instances, however, the trunk racks have either derived their support while in their load-supporting position from the bumpers on which they are mounted or from special construction of the bumper structures to which they are attached.

It is the principal object of the present invention to provide a pivoted trunk rack having all of the advantages of the trunk racks shown in the above-mentioned patents and being further adapted for use upon bumpers and bumper tips of general commercial construction without alteration of the bumper structure upon which the trunk rack is to be mounted, and which trunk rack may be readily folded into a non-supporting or a supporting position and will be held therein by a mounting fitting of universal application.

The present invention contemplates the use of a luggage-supporting frame or platform carrying pivoted fittings whereby said supporting frame may be pivotally mounted to a bumper structure and in the rear thereof, in a manner to permit the frame to swing to a non-supporting vertical position and to swing and be supported in a load-supporting horizontal position.

The invention is illustrated by way of example in the accompanying drawings in which—

Figure 1 is a view in plan illustrating the present invention as applied to one form of bumper.

Figure 2 is a view in plan showing the invention as applied to another form of bumper.

Figure 3 is a view in transverse section through the trunk rack mounting and the bumper as seen on the line 3—3 of Figure 2.

Figure 4 is a view in transverse section through the bumper mounting as seen on the line 4—4 of Figure 1.

Figure 5 is a view in perspective showing the trunk rack as applied to the wings of a bumper structure of the general design shown in Figure 1.

Figure 6 is a view in section and elevation through the trunk rack and bumper indicating the trunk rack by solid lines as in its horizontal load-supporting position and by dotted lines in its vertical nonload-supporting position.

Figure 7 is an enlarged view in perspective showing one of the trunk rack fittings.

Referring more particularly to the drawings:—10 and 11 indicate a pair of supporting brackets by which a bumper structure 12 is secured transversely of the rear of an automobile main frame. It is to be understood that the bumper structure may be of any preferred form, as for example it may embody the use of bumper tips or wings 13 and 14, as shown in Figure 1, or the use of a bumper bar 15 which continues entirely across the rear of an automobile. In any event, a trunk rack or supporting platform 16 is adapted to be secured to the bumper structure. This rack, as shown in Figures 1 and 5 of the drawing, consists of a rectangular frame having transversely extending rails 18 and 19 and longitudinally connecting rails 20 and 21. The frame or platform is supplemented by a plurality of slats or bars 22, which make a supporting structure upon which luggage may be disposed when the trunk rack is swung to its horizontal position.

It will be understood of course that the exact construction of the trunk rack is not essential to the present invention, but that it may be of any desired design whereby it will satisfactorily support a load when disposed in this horizontal position. The rack as here shown, is provided with mounting fittings 23. These fittings are formed with a back plate 24 and a horizontally projecting bearing plate 25 formed integral therewith and disposed at right angles thereto. This plate is suitably reinforced so that it will satisfactorily support the load disposed upon the trunk rack. The detail of construction of the fitting 23 is clearly shown in Figures 3, 4 and 7 of the drawing. A bearing plate 25 is formed with holes 26 adapted to receive pivot bolts 26'. The fitting as shown in the drawing is formed with two of these holes. This construction has been followed in order to make the fittings reversible so that identical fittings may be used on opposite sides of the trunk rack without requiring special and individual machine work to produce each of the fittings. Formed on one side of each of the bearing plates 25 are a pair of horizontal lugs 27 and 28 and a vertical lug 29. The opposing faces of the lugs 27 and 28 are parallel and are disposed horizontally when the fitting is secured to a bumper structure. These lugs are used to co-operate with the trunk rack when swung to its horizontal position and to form a fixed shoulder against which the upwardly swinging innermost end of the trunk rack frame may abut when the frame is in its horizontally disposed position. It will of course be understood that for this purpose the uppermost lug will be encountered by the upwardly swinging portion of the trunk rack frame and that the lugs 27 and 28 are provided so that when the fitting is turned over it will be applicable for use upon either side of the trunk rack. The vertically disposed lug 29 is on the outer edge of the bearing plate 25 and is disposed on a plane substantially midway between the horizontal planes of the bolt holes 26. The width of this vertical lug is such that the uppermost edge of the lug will be engaged by the lower face of the trunk rack frame 16 when the frame swings to its horizontal position as particularly shown in Figure 6 of the drawing. Thus the under face of the upper lugs 27 and the upper face of the vertical lug 29 will be disposed on opposite sides of the fulcrum point of the trunk rack and the lugs will therefore co-operate in supporting the load imposed upon the trunk rack when the rack is disposed horizontally. When the trunk rack is in its vertical position, as indicated by dotted lines in Figure 6, the inner face of the lug 29 will be encountered by the under face of the trunk rack and will act to steady the trunk rack in its vertical position. If desired, a lock bolt 41 may be passed through the upper bolt hole 42 or other similar means may be provided to hold the trunk rack in its vertical position. Under normal conditions, however, a spring washer 31 is positioned between the nut 32 on the pivot bolts 26' and the face of the trunk rack frame to create sufficient friction to hold the trunk rack in either its operative or inoperative position.

The trunk rack fittings 25 may be secured to the bumpers or bumper tips in any desired manner, as required to accommodate bumpers and bumper tips of different configurations, and with a different number of bumper bars, as shown in Figure 4 of the drawings, a two-part clamp is provided. This comprises a bar 33 and a bar 34. These bars overlap each other and are formed with a central slotted opening 34 to receive a clamping bolt 35. The opposite free ends of the clamping bars are turned to form lips 36 which project over the outer edges of the bars 37 of the bumper tips of the bumper. When the clamping bars have been suitably adjusted to the bumper bars, the bolt 35 may be tightened by its nut 38 and will thus rigidly hold the mountings 23 in position upon the bumper structure. In some instances, however, it is desirable to mount the bumper upon a single bumper bar, as indicated at 39 in Figure 2. When this is done a clamping bar 40 may be provided having filler plates or lugs 42 of a width equal to the bumper bar 39. Bolts 43 may then be passed through openings in the plate 24 and the clamping bar 40 and upon opposite sides of the bar 39 upon which the device is mounted.

In operation of the present invention the trunk rack may be made up as desired and may be equipped with complementary fittings 25 and may thereafter be applied to a bumper structure as shown in Figures 1, 2 or 5. It will be recognized that for convenience in shipping and packing, the mountings 25 may be removed from the rack and that the necessary parts of the structure, including rack frame and the mountings, may be placed in a compact guard so that the device may be readily merchandised through jobbers and dealers.

When the device has been rigidly mounted upon a bumper by the clamping plates and the bolts, the trunk rack may be used. Normally the trunk rack will stand in the vertical dotted line position shown in Figure 6 in which position it will serve as additional collision protection for the rear of the car and across the area way occupied by the spare tire. When it is desired to use the trunk rack, it may be swung downwardly to its horizontal position, as indicated by full lines in Figure 6, at which time the upper edge of the trunk rack adjacent the pivot bolts will engage the under faces of the lugs 27 and the lower face of the trunk rack in the rear of the pivot bolts will encounter the upper faces of the vertical lugs 29, thus firmly holding the trunk rack in its horizontal p tion and providing suitable means upon opposite sides of the fulcrum points of the trunk rack to support the rack and a considerable load which may be imposed thereupon. When the use of the rack is not desired, it may again be folded to its vertical position, or when it is not expected to use the rack for a prolonged period of time, the entire structure may be removed from the bumper and conveniently stored.

By referring to Fig. 6 of the drawings, it will be seen that the rack may be locked in either of its positions by a lock bolt 41. This bolt is adapted to pass through one of two openings in the fittings. In operation, the bolt is positioned through the upper one of the openings 42 so that the space between the upper and rear faces of the bolt head will be flush against the frame of the rack. In this manner, the rack will be securely fastened between the head of the bolt and lug 27 or 28, as the case may be, when the rack lies horizontally and the head of the bolt and the lug 29 when the rack is in its vertical position.

While I have shown the preferred form of my invention as now known to me, it will be understood that various changes may be made in the combination, construction and arrangement of parts without departing from the spirit of the invention as claimed.

Having thus described my invention, what I claim and desire to secure by Letters Patent is—

1. In combination with a bumper structure adapted to be disposed transversely of the rear of a vehicle, a foldable trunk rack, and means for pivotally mounting said trunk rack upon the bumper and at the rear thereof.

2. In combination with a bumper structure adapted to be disposed transversely of the rear of a vehicle, a foldable trunk rack, and means for pivotally mounting said trunk rack upon the bumper and at the rear thereof, and means embodied in said pivotal mountings for holding the trunk rack in a manner to support a load when said trunk rack is in its horizontal position.

3. In combination with a bumper structure adapted to be disposed transversely of the rear of a vehicle, a foldable trunk rack, means for pivotally mounting said trunk rack upon the bumper and at the rear thereof, means embodied in said pivotal mountings for holding the trunk rack in a manner to support a load when said trunk rack is in its horizontal position, and means for limiting the vertical swinging movement of the trunk rack and positioning said trunk rack in a vertical non-supporting position.

4. In combination with a bumper construction adapted to be supported transversely of the rear of a vehicle, a trunk rack, mounting members pivotally secured to the trunk rack adjacent its opposite ends and near one edge thereof and means for fastening said mounting members to the bumper structure, and means for securing said trunk rack mountings against the rear face of the bumper structure whereby said trunk rack may swing upon its pivots from a vertical to a horizontal position, and stop members formed as part of said mountings for holding the trunk rack and its load when the rack has moved to its horizontal position.

5. In combination with a bumper construction adapted to be supported transversely of the rear of a vehicle, a trunk rack, mounting members pivotally secured to the truck rack adjacent its opposite ends and near one edge thereof and means for fastening said mounting members to the bumper structure, and means for securing said trunk rack mountings against the rear face of the bumper structure whereby said trunk rack may swing upon its pivots from a vertical to a horizontal position, and stop members formed as part of said mountings for holding the trunk rack and its load when the rack has moved to its horizontal position, and stop members carried by said mounting for limiting the vertical swinging movement of the trunk rack and for holding said trunk rack in its vertical position when desired.

6. In combination with a bumper structure and a trunk rack adapted to be pivotally supported from the impact surface thereof, mounting members disposed at the opposite ends of said rack, said members comprising a fastening plate adapted to lie against the impact surface of the bumper, a bearing plate extending substantially at right angles to the fastening plate and projecting outwardly from the face of the bumper, pivot bolts carried by the bearing plate and adapted to engage the opposite ends of the trunk rack to pivotally support the same, means on the rear of the bumper co-operating with the fastening plate, and fastening members passing through said fastening plate and the rear bumper clamps.

7. In combination with a bumper structure and a trunk rack adapted to be pivotally supported from the impact surface thereof, mounting members disposed at the opposite ends of said rack, said members comprising a fastening plate adapted to lie against the impact surface of the bumper, a bearing plate extending substantially at right angles to the fastening plate and projecting outwardly from the face of the bumper, pivot bolts carried by the bearing plate and adapted to engage the opposite ends of the trunk rack to pivotally support the same means on the rear of the bumper cooperating with the fastening plate, and fastening members passing through said fastening plate and the rear bumper clamps, and sets of stops forming a part of the bearing plates and adapted to limit the swinging movement of the trunk rack from its vertical to horizontal positions.

8. In combination with a bumper structure and a trunk rack adapted to be pivotally supported from the impact surface thereof, mounting members disposed at the opposite ends of said rack, said members comprising a fastening plate adapted to lie against the impact surface of the bumper, a bearing plate extending substantially at right angles to the fastening plate and projecting outwardly from the face of the bumper, pivot bolts carried by the bearing plate and adapted to engage the opposite ends of the trunk rack to pivotally support the same, means on the rear of the bumper cooperating with the fastening plate, and fastening members passing through said fastening plate and the rear bumper clamps, and sets of stops forming a part of the bearing plates and adapted to limit the swinging movement of the trunk rack from its vertical to horizontal position, said members co-operating to support the trunk rack and its load when the trunk rack is in a vertical position.

EDWARD H. SPECHT.